US007378470B2

(12) United States Patent
Persigehl et al.

(10) Patent No.: US 7,378,470 B2
(45) Date of Patent: May 27, 2008

(54) MOLDING COMPOSITIONS BASED ON A THERMOPLASTIC POLYESTER WITH IMPROVED FLOWABILITY

(75) Inventors: Peter Persigehl, Wuxi (CN); Detlev Joachimi, Krefeld (DE); Kurt Jeschke, Düsseldorf (DE); Marcus Schäfer, Krefeld (DE); Ralph Ulrich, Ratingen (DE); Robert Hubertus Van Mullekom, Lokeren (BE); Jochen Endtner, Köln (DE); Jens Peter Joschek, Köln (DE); Matthias Bienmüller, Krefeld (DE)

(73) Assignee: LANXESS Deutschland GmbH, Leverkusen (DE)

( * ) Notice: Subject to any disclaimer, the term of this patent is extended or adjusted under 35 U.S.C. 154(b) by 193 days.

(21) Appl. No.: 11/291,028

(22) Filed: Nov. 30, 2005

(65) Prior Publication Data

US 2006/0211810 A1    Sep. 21, 2006

Related U.S. Application Data

(63) Continuation-in-part of application No. PCT/EP2005/006135, filed on Jun. 8, 2005.

(30) Foreign Application Priority Data

Jun. 8, 2004  (DE)  ...................... 10 2004 027 873
Feb. 25, 2005  (DE)  ...................... 10 2005 009 201
Mar. 1, 2005  (DE)  ...................... 10 2005 009 911

(51) Int. Cl.
*C08L 67/02*  (2006.01)

(52) U.S. Cl. ...................... 525/167; 525/168; 525/169; 525/170; 525/171; 525/172; 525/173; 525/174; 525/176

(58) Field of Classification Search ................ 525/167, 525/168, 169, 17, 171, 172, 173, 174, 176
See application file for complete search history.

(56) References Cited

U.S. PATENT DOCUMENTS

| 3,189,662 | A |   | 6/1965  | Vaughn, Jr. .................. 260/824 |
| 3,419,634 | A |   | 12/1968 | Vaughn, Jr. .................. 260/824 |
| 3,644,574 | A |   | 2/1972  | Jackson, Jr. et al. ........ 260/873 |
| 3,692,744 | A |   | 9/1972  | Rich et al. ................. 260/75 T |
| 4,013,613 | A |   | 3/1977  | Abolins et al. ........... 260/40 R |
| 4,035,958 | A |   | 7/1977  | Nishio ......................... 51/425 |
| 4,176,224 | A |   | 11/1979 | Bier et al. .................. 528/309 |
| 4,753,980 | A | * | 6/1988  | Deyrup ....................... 524/369 |
| 4,806,593 | A |   | 2/1989  | Kress et al. .................. 525/63 |
| 4,812,515 | A |   | 3/1989  | Kress et al. .................. 525/69 |
| 4,859,740 | A |   | 8/1989  | Damrath et al. ............. 525/100 |
| 4,861,831 | A |   | 8/1989  | Damrath et al. ............. 525/100 |
| 4,937,285 | A |   | 6/1990  | Wittmann et al. ............. 525/67 |
| 4,982,014 | A |   | 1/1991  | Freitag et al. ............... 568/721 |
| 6,020,414 | A |   | 2/2000  | Nelsen et al. ............... 524/424 |
| 6,060,580 | A |   | 5/2000  | Nijenhuis et al. ........... 528/332 |
| 6,165,610 | A | * | 12/2000 | Moore et al. ................ 428/344 |
| 6,538,024 | B1 |   | 3/2003  | MacDonald et al. ........ 514/478 |
| 6,576,309 | B2 | * | 6/2003  | Dalgewicz et al. ........ 428/36.8 |
| 6,579,943 | B1 | * | 6/2003  | Ishino et al. ................. 525/166 |
| 6,759,480 | B1 |   | 7/2004  | Bouilloux et al. ............ 525/60 |

FOREIGN PATENT DOCUMENTS

| DE | 24 07 776 | 9/1975 |
| FR | 2 819 821 | 7/2002 |
| JP | 1 247454  | 10/1989 |
| WO | 9827159   | 6/1998 |
| WO | 01/38437  | 5/2001 |

OTHER PUBLICATIONS

Kunststoffe 2000, 90 (9), p. 116-118 Carl Hanser Verlag, Munchen; Kleben von Kunststoffen, Eine Ubersicht (with English Translation "Bonding of Plastics").
Advances in Polymer Science 1999, 143 (Branched Polymers II), pp. 1-34 Anders Hult et al; "Hyperbranched Polymers" Springer-Verlag Berlin Heidelberg 1999.
Kunststoff-Handbuch [Plastics Handbook], vol. VIII, pp. 695 et seq., Karl-Hanser-Verlag, Munich 1973 "Polyalkylenterephthalate" Von Dr. phil. Klaus-Dieter Asmus, Frankfurt a.M.—Hoechst.
Ullmann, Enzyklopadie der Technischen Chemie [Encyclopaedia of Industrial Chemistry]. vol. 19, (1980, pp. 277-295 "Polystyrol einschlleblich ABS und SAN".
H. Schnell, "Chemistry and Physics of Polycarbonates", Polymer Reviews, vol. 9, pp. 77-98 Interscience Publishers, New York, London, Sydney, 1964 "IV. The Production of the Most Important Raw Materials and Intermediates for Aromatic Polycarbonates".
H. Schnell, "Chemistry and Physics of Polycarbonates", Polymer Reviews, vol. 9, pp. 31-76 Interscience Publishers, New York, London, Sydney, 1964 "III. Chemistry of Polycarbonates".

* cited by examiner

*Primary Examiner*—Bernard Lipman
(74) *Attorney, Agent, or Firm*—Nicanor A. Kohncke

(57) ABSTRACT

This invention relates to thermoplastic molding compositions with improved flowability based on a thermoplastic polyester and on at least one copolymer composed of at least one olefin with at least one methacrylic ester or acrylic ester of an aliphatic alcohol, the MFI of the copolymer being not less than 50 g/10 min, to a process for preparation of these molding compositions, and also the use of these molding compositions for production of moldings for the electrical, electronics, telecommunications, motor vehicle or computer industry, in sports, in the household, in medicine or for the entertainment industry.

13 Claims, No Drawings

MOLDING COMPOSITIONS BASED ON A THERMOPLASTIC POLYESTER WITH IMPROVED FLOWABILITY

CROSS REFERENCE TO RELATED APPLICATION

This application is a continuation-in-part of the International Application No. PCT/EP/2005/006135 filed Jun. 8, 2005 claiming priority to DE102004027873.3 filed Jun. 8, 2004, DE102005009201.2 filed Feb. 25, 2005, and DE102005009911.4 filed Mar. 1, 2005.

This invention relates to molding compositions based on a thermoplastic polyester and on at least one copolymer composed of at least one α-olefin with at least one methacrylic ester or acrylic ester of an aliphatic alcohol, the MFI (Melt Flow Index) of the copolymer being not less than 50 g/10 min, to a process for preparation of these molding compositions, and also the use of these molding compositions for production of moldings for the electrical, electronics, telecommunications, motor vehicle or computer industry, in sports, in the household, in medicine or for the entertainment industry.

BACKGROUND OF THE INVENTION

Highly flowable thermoplastic compositions are of interest for a wide variety of injection molding applications. By way of example, thin-walled components in the electrical, electronics and motor vehicle industry require low viscosities from the thermoplastics composition in order to permit material to be charged to the mold with minimum injection pressures and, respectively, clamping forces in the appropriate injection molding machines. This also applies to simultaneous charging of material to two or more injection molding components by way of a shared runner system in what are known as multicavity tooling systems. Shorter cycle times can moreover often be achieved using low-viscosity thermoplastic compositions. Good flowabilities are also specifically very important for highly filled thermoplastic compositions, e.g. with glassfibre and/or mineral contents above 40% by weight.

However, although the thermoplastic compositions have high flowability, the actual components produced therefrom are subjected to stringent mechanical requirements, and the lowering of viscosity cannot therefore be permitted to impair mechanical properties.

There are a number of ways of obtaining highly flowable, low-viscosity thermoplastic molding compositions.

One way uses low-viscosity polymer resins with very low molecular weight as base polymers for the thermoplastic molding compositions. However, the use of low-molecular-weight polymer resins is often associated with sacrifices in mechanical properties, in particular toughness. Preparation of a low-viscosity polymer resin in an existing polymerization plant moreover often requires complicated intervention attended by capital expenditure.

Another way uses what are known as flow aids, also termed flow agents or flow assistants or internal lubricants, which can be added as an additive to the polymer resin.

These flow aids are known from the literature, e.g. in Kunststoffe 2000, 90 (9), p. 116-118, and by way of example can be fatty acid esters of polyols, or amides derived from fatty acids and from amines. However, these fatty acid esters, such as pentaerythritol tetrastearate or ethylene glycol dimonitanoate, have only limited miscibility with polar thermoplastics, such as polyamides, polyalkylene terephthalates or polycarbonates. Their concentration increases at the surface of the molding and they are therefore also used as mold-release aids. Particularly at relatively high concentrations, they can also migrate out of these moldings to the surface on heat-ageing and become concentrated at the surface. By way of example, in coated moldings this can lead to problems with regard to adhesion to paint or to metal.

As an alternative to the surface-active flow aids, it is possible to use internal flow aids which are compatible with the polymer resins. Examples of those suitable for this purpose are low-molecular-weight compounds or branched, highly branched or dendritic polymers whose polarity is similar to that of the polymer resin. These highly branched or dendritic systems are known from the literature and their basis can by way of example be branched polyesters, polyamides, polyesteramides, polyethers or polyamines, as described in *Kunststoffe* 2001, 91 (10); pp. 179-190, or in *Advances in Polymer Science* 1999, 143 (Branched Polymers II), pp. 1-34.

EP 0 682 057 A1 describes the use of the nitrogen-containing first-generation 4-cascade dendrimer: 1,4-diaminobutane[4]propylamine (N,N'-tetrabis(3-aminopropyl)-1,4-butanediamine) DAB(PA)$_4$ to lower viscosity in nylon-6, nylon-6,6 and polybutylene terephthalate. While use of DAB(PA)$_4$ to lower viscosity in polyamides has practically no effect on the impact resistance of the resultant molding compositions (difference <5%), impact resistance falls by more than 15% in the case of PBT.

WO-A 98 27159 describes an improvement in toughness of glassfibre-reinforced polyesters or polycarbonates via use of two copolymers composed of ethene and of acrylates, one copolymer also bearing a reactive epoxy or oxirane function. Flow improvement in the molding compositions is an object of the invention, but the comparison system described composed of polyester and of the copolymer composed of ethene and methylacrylate has higher melt viscosity than the pure polyester system.

JP 01247454 describes mixtures which have low-temperature toughness, of polyesters with a copolymer composed of ethene and of an unreactive alkyl acrylate whose MFI is 5.8 g/10 min (at 190° C., 2.16 kg) and with a copolymer composed of ethene and of an acrylate having an additional reactive group. The subject of that application is not flow improvement in molding compositions.

EP-A 1 191 067 (=U.S. Pat. No. 6,759,480) describes the impact modification of thermoplastics, inter alia of polyamide and polybutylene terephthalate via a mixture composed of a copolymer composed of ethene with an unreactive alkyl acrylate, and also of a copolymer composed of ethene with an acrylate having an additional reactive group. There is no discussion of the flowability of the molding composition.

EP-A 0 838 501 (=U.S. Pat. No. 6,020,414) describes mixtures having low-temperature toughness of reinforcing materials and polyesters with a copolymer composed of ethene and of an unreactive alkyl acrylate, and also with a copolymer composed of ethene and of an acrylate having an additional reactive group. The best embodiment in that application is achieved with a copolymer composed of ethene and methyl acrylate. The subject of that application is not flow improvement in molding compositions.

WO-A 2 001 038 437 (AU 4 610 801 A) describes mixtures composed of polyester with a core-shell rubber and with two different copolymers composed of ethene and of acrylates with and without additional reactive groups. The toughness of the molding compositions can be improved, and the flowability even of the binary mixtures composed of polyester and of one of the other constituents mentioned is, according to Table 4 and Table 9, not better for the mixtures used than for the pure polyesters. The copolymer used composed of ethene and 2-ethylhexyl acrylate has an MFI value (MFI=Melt Flow Index) of 2 g/10 min (at 190° C., 2.16 kg).

FR-A 28 19 821 describes the use of copolymers composed of ethene with 2-ethylhexyl acrylate whose MFI is smaller than 100 as a constituent of hot-melt adhesive mixtures. There are no indications of applications for elastomer modification or flow improvement of semicrystalline thermoplastics.

DISCLOSURE OF THE INVENTION

The object of the present invention then consisted in lowering the viscosity of polycondensate compositions based on thermoplastic polyesters by treating the polymer melt with additives, without any resultant need to accept the losses that occur when using low-viscosity linear polymer resins or when using additives disclosed in the literature in properties such as impact strength, tensile strain at break and hydrolysis resistance. In terms of stiffness and ultimate tensile strength, the compositions based on thermoplastic polyesters should if at all possible not differ significantly from the polycondensate compositions based on thermoplastic polyesters and not treated with additives, in order to permit problem-free replacement of the materials for plastics structures based on thermoplastic polyesters.

Achievement of the object is provided by thermoplastic molding compositions comprising
A) from 99.9 to 10 parts by weight, preferably from 99.5 to 30 parts by weight, particularly preferably from 99.0 to 55 parts by weight, of at least one thermoplastic polyester, preferably of a polyalkylene terephthalate and
B) from 0.1 to 20 parts by weight, preferably from 0.25 to 15 parts by weight, particularly preferably from 1.0 to 10 parts by weight, of at least one copolymer composed of at least one olefin, preferably one α-olefin and of at least one methacrylic ester or acrylic ester of an aliphatic alcohol, preferably of an aliphatic alcohol having from 1 to 30 carbon atoms, the MFI (Melt Flow Index) of the copolymer B) being not less than 50 g/10 min, preferably being in a range between 80 and 900 g/10 min.

which are therefore provided by the present invention.

For the purposes of the present invention, measurement or determination of the MFI (Melt Flow Index) always took place at 190° C. with a test load of 2.16 kg.

Surprisingly, it has been found that mixtures of thermoplastic polyesters and of a copolymer of α-olefins with methacrylic esters or with acrylic esters of aliphatic alcohols whose MFI is not less than 50 g/10 min lead to the desired lowering of the melt viscosity of the inventive molding compositions prepared therefrom, and that these inventive molding compositions, when compared with molding compositions without copolymer, exhibit no sacrifices—but rather indeed generally marked improvements—in properties such as impact resistance, tensile strain at break and hydrolysis resistance. The molding compositions have excellent suitability for use in thin-wall technology.

According to the invention, the thermoplastic molding compositions comprise, as component A), at least one thermoplastic polyester, preferably semiaromatic polyesters.

The thermoplastic, preferably semiaromatic, polyesters to be used according to the invention as component A) have been selected from the group of the polyalkylene terephthalates, preferably selected from the group of the polyethylene terephthalates, of the polytrimethylene terephthalates and of the polybutylene terephthalates, particularly preferably of the polybutylene terephthalates and polyethylene terephthalates, very particularly preferably of polybutylene terephthalate.

Semiaromatic polyesters are materials whose molecules contain not only aromatic moieties but also aliphatic moieties.

For the purposes of the invention, polyalkylene terephthalates are reaction products derived from aromatic dicarboxylic acids or from their reactive derivatives (e.g. dimethyl esters or anhydrides) and aliphatic, cycloaliphatic or araliphatic diols or are mixtures of these reaction products.

Preferred polyalkylene terephthalates can be prepared from terephthalic acid (or from its reactive derivatives) and from aliphatic or cycloaliphatic diols having from 2 to 10 carbon atoms, by known methods (Kunststoff-Handbuch [Plastics Handbook], Vol. VIII, pp. 695 et seq., Karl-Hanser-Verlag, Munich 1973).

Preferred polyalkylene terephthalates contain at least 80 mol %, preferably 90 mol %, based on the dicarboxylic acid, of terephthalic acid radicals and at least 80 mol %, preferably at least 90 mol %, based on the diol component, of ethylene glycol radicals and/or 1,3-propanediol radicals and/or 1,4-butanediol radicals.

The preferred polyalkylene terephthalates can contain, alongside terephthalic acid radicals, up to 20 mol % of radicals of other aromatic dicarboxylic acids having from 8 to 14 carbon atoms or radicals of aliphatic dicarboxylic acids having from 4 to 12 carbon atoms, e.g. radicals of phthalic acid, isophthalic acid, naphthalene-2,6-dicarboxylic acid, 4,4'-biphenyldicarboxylic acid, succinic acid, adipic acid, sebacic acid, azelaic acid, cyclohexanediacetic acid, cyclohexanedicarboxylic acid.

The preferred polyalkylene terephthalates can contain, alongside ethylene radicals and, respectively, 1,3-propanediol radicals and, respectively, 1,4-butanediol radicals, up to 20 mol % of other aliphatic diols having from 3 to 12 carbon atoms or of cycloaliphatic diols having from 6 to 21 carbon atoms, e.g. radicals of 1,3-propanediol, 2-ethyl-1,3-propanediol, neopentyl glycol, 1,5-pentanediol, 1,6-hexanediol, cyclohexane-1,4-dimethanol, 3-methyl-2,4-pentanediol, 2-methyl-2,4-pentanediol, 2,2,4-trimethyl-1,3-pentanediol and 2,2,4-trimethyl-1,6-pentanediol, 2-ethyl-1,3-hexanediol, 2,2-diethyl-1,3-propanediol, 2,5-hexanediol, 1,4-di(β-hydroxyethoxy)benzene, 2,2-bis(4-hydroxycyclohexyl)propane, 2,4-dihydroxy-1,1,3,3-tetramethylcyclobutane, 2,2-bis(3-β-hydroxyethoxyphenyl)propane and 2,2-bis (4-hydroxypropoxyphenyl)propane (DE-A 24 07 674 (=U.S. Pat. No. 4,035,958), DE-A 24 07 776, DE-A 27 15 932 (=U.S. Pat. No. 4,176,224)).

The polyalkylene terephthalates can be branched via incorporation of relatively small amounts of tri- or tetrahydric alcohols or of tri- or tetrabasic carboxylic acid, as described by way of example in DE-A 19 00 270 (=U.S. Pat. No. 3,692,744). Examples of preferred branching agents are trimesic acid, trimellitic acid, trimethylolethane and trimethylolpropane and pentaerythritol.

It is advisable not to use more than 1 mol % of the branching agent, based on the acid component.

Particular preference is given to polyalkylene terephthalates prepared solely from terephthalic acid and from its reactive derivatives (e.g. dialkyl esters thereof) and ethylene glycol and/or 1,3-propanediol and/or 1,4-butanediol (polyethylene terephthalate and polybutylene terephthalate), and mixtures of these polyalkylene terephthalates.

Other preferred polyalkylene terephthalates are copolyesters prepared from at least two of the abovementioned acid components and/or from at least two of the abovementioned alcohol components, particularly preferred copolyesters being poly(ethylene glycol/1,4-butanediol) terephthalates.

The intrinsic viscosity of the polyalkylene terephthalates is generally from about 0.3 cm$^3$/g to 1.5 cm$^3$/g, preferably from 0.4 cm$^3$/g to 1.3 cm$^3$/g, particularly preferably from 0.5 cm$^3$/g to 1.0 cm$^3$/g, in each case measured in phenol/o-dichlorobenzene (1:1 parts by weight) at 25° C.

The thermoplastic polyesters to be used according to the invention can also be used in a mixture with other polyesters and/or with other polymers.

Conventional additives, e.g. mold-release agents, stabilizers and/or flow aids can be admixed in the melt with the polyesters to be used according to the invention, or can be applied to their surface.

The inventive compositions comprise, as component B), copolymers, preferably random copolymers composed of at least one olefin, preferably an α-olefin and of at least one methacrylic ester or acrylic ester of an aliphatic alcohol, the MFI of the copolymer B) being not less than 50 g/10 min, preferably being in a range between 80 and 900 g/10 min. In one preferred embodiment, less than 4% by weight, particularly preferably less than 1.5% by weight and very particularly preferably 0% by weight of the copolymer B) is composed of monomer units which contain further reactive functional groups (selected from the group consisting of epoxides; oxetanes, anhydrides, imides, aziridines, furans, acids, amines, oxazolines).

Suitable olefins, preferably α-olefins as constituent of the copolymers B) preferably have from 2 to 10 carbon atoms and can be unsubstituted or have substitution by one or more aliphatic, cycloaliphatic or aromatic groups.

Preferred olefins have been selected from the group consisting of ethene, propene, 1-butene, 1-pentene, 1-hexene, 1-octened; 3-methyl-1-pentene. Particularly preferred olefins are ethene and propene, and ethene is very particularly preferred.

Mixtures of the olefins described are also suitable.

In another preferred embodiment, the further reactive functional groups (selected from the group consisting of epoxides, oxetanes, anhydrides, imides, aziridines, furans, acids, amines, oxazolines) of the copolymer B) are introduced exclusively by way of the olefins into the copolymer B).

The content of the olefin in the copolymer B) is from 50 to 95% by weight, preferably from 55 to 93% by weight.

The copolymer B) is further defined via the second constituent alongside the olefin. A suitable second constituent is alkyl or arylalkyl esters of acrylic acid or methacrylic acid whose alkyl or arylalkyl group is formed by from 1 to 30 carbon atoms. This alkyl or arylalkyl group can be linear or branched, and can also contain cycloaliphatic or aromatic groups, and alongside this may also have substitution by one or more ether or thioether functions. Other suitable methacrylic or acrylic esters in this connection are those synthesized from an alcohol component which are based on oligoethylene glycol or oligopropylene glycol having only one hydroxy group and at most 30 carbon atoms.

By way of example, the alkyl or arylalkyl group of the methacrylic or acrylic ester can have been selected from the group consisting of methyl, ethyl, n-propyl, i-propyl, n-butyl, s-butyl, i-butyl, t-butyl, 1-pentyl, 1-hexyl, 2-hexyl, 3-hexyl, 1-heptyl, 3-heptyl, 1-octyl, 1-(2-ethyl)hexyl, 1-nonyl, 1-decyl, 1-dodecyl, 1-lauryl or 1-octadecyl. Methyl, butyl and 2-ethylhexyl are preferred. Especially preferred are acrylic acid-n-butylester and acrylic acid-2-ethylhexylester.

Mixtures of the acrylic or methacrylic esters described are also suitable.

It is preferable here to use more than 50% by weight, particularly preferably more than 90% by weight and very particularly preferably 100% by weight, of 2-ethylhexyl acrylate or n-butyl acrylate, based on the total amount of acrylic and methacrylic ester in copolymer B).

In another preferred embodiment, the further reactive functional groups (selected from the group consisting of epoxides, oxetanes, anhydrides, imides, aziridines, furans, acids, amines, oxazolines) of the copolymer B) are introduced exclusively by way of acrylic or methacrylic ester into the copolymer B).

The content of the acrylic or methacrylic esters in the copolymer B) is from 5 to 50% by weight, preferably from 7 to 45% by weight.

A feature of suitable copolymers B) is not only their constitution but also their low molecular weight. Accordingly, copolymers B) suitable for the inventive molding compositions are only those whose MFI value, measured at 190° C. and with a load of 2.16 kg, is at least 50 g/10 min, preferably being in a range between 80 and 900 g/10 min.

Examples of suitable copolymers of component B) can have been selected from the group of the materials supplied by Atofina with the trade mark Lotryl®, this usually being used as hot-melt adhesive.

In one preferred embodiment, the inventive thermoplastic molding compositions can comprise, in addition to components A) and B), one or more components from the series C), D), E), F) or G).

In one preferred embodiment of this type, the thermoplastic molding compositions can also comprise, in addition to components A) and B), C) from 0.001 to 70 parts by weight, preferably from 5 to 50 parts by weight, particularly preferably from 9 to 47 parts by weight, of a filler and/or reinforcing material.

However, the material can also comprise a mixture composed of two or more different fillers and/or reinforcing materials, for example based on talc, mica, silicate, quartz, titanium dioxide, wollastonite, kaolin, amorphous silicas, magnesium carbonate, chalk, feldspar, barium sulphate, glass beads and/or fibrous fillers and/or reinforcing materials based on carbon fibres and/or glassfibres. It is preferable to use mineral particulate fillers based on talc, mica, silicate, quartz, titanium dioxide, wollastonite, kaolin, amorphous silicas, magnesium carbonate, chalk, feldspar, barium sulphate and/or glassfibres. According to the invention, it is particularly preferable to use mineral particulate fillers based on talc, wollastonite, kaolin and/or glassfibres.

Particularly for applications which demand isotropy in dimensional stability and demand high thermal dimensional stability, for example in motor vehicle applications for exterior bodywork parts, it is preferable to use mineral fillers, in particular talc, wollastonite or kaolin.

A further particular preference is also the use of acicular mineral fillers as component C). According to the invention, acicular mineral fillers are a mineral filler with pronounced acicular character. An example which may be mentioned is acicular wollastonites. The length:diameter ratio of the material is preferably from 2:1 to 35:1, particularly preferably from 3:1 to 19:1, most preferably from 4:1 to 12:1. The average particle size of the inventive acicular minerals is preferably smaller than 20 µm, particularly preferably smaller than 15 μm, with particular preference smaller than 10 μm, determined using a CILAS GRANULOMETER.

As previously described above, the filler and/or reinforcing material may, if appropriate, have been surface-modified, for example using a coupling agent or coupling agent system, e.g. based on silane. However, the pretreatment is not essential. In particular when glassfibres are used, polymer dispersions, film-formers, branching agents and/or glassfibre processing aids can also be used in addition to silanes.

The glassfibres to be used with particular preference according to the invention whose fibre diameter is generally from 7 to 18 μm, preferably from 9 to 15 μm, are added in the form of continuous-filament fibres or in the form of chopped or ground glassfibres. The fibres can have been equipped with a suitable size system and with a coupling agent or coupling agent system, e.g. based on silane.

Familiar coupling agents based on silane for pretreatment are silane compounds having by way of example the general formula (I)

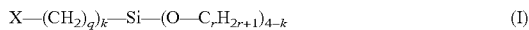

where the substituents are as follows:
X: NH$_2$—, HO—,

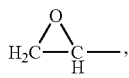

q: a whole number from 2 to 10, preferably from 3 to 4,
r: a whole number from 1 to 5, preferably from 1 to 2,
k: a whole number from 1 to 3, preferably 1.

Preferred coupling agents are silane compounds from the group of aminopropyltrimethoxysilane, aminobutyltrimethoxysilane, aminopropyltriethoxysilane, aminobutyltriethoxysilane, and also the corresponding silanes which contain a glycidyl group as substituent X.

The amounts generally used of the silane compounds for surface coating of the fillers are from 0.05 to 2% by weight, preferably from 0.25 to 1.5% by weight and in particular from 0.5 to 1% by weight, based on the mineral filler.

The consequence of processing to give the molding composition or molding is that the d97 or d50 value of the particulate fillers in the molding composition or in the molding can be smaller than that of the fillers initially used. A consequence of the processing to give the molding composition or molding is that the length distributions of the glassfibres in the molding composition or in the molding can be shorter than those of the material initially used.

In an alternative preferred embodiment, the thermoplastic molding compositions can also comprise, in addition to components A) and B) and/or C)
D) from 0.001 to 50 parts by weight, preferably from 9 to 35 parts by weight, of at least one flame retardant.

Flame retardants that can be used in component D) are commercially available organic halogen compounds with synergists or are commercially available organic nitrogen compounds or are organic/inorganic phosphorus compounds individually or in a mixture. It is also possible to use mineral flame retardant additives such as magnesium hydroxide or Ca Mg carbonate hydrates (e.g. DE-A 4 236 122 (=CA 2 109 024 A1)). It is also possible to use salts of aliphatic or of aromatic sulphonic acids. Examples which may be mentioned of halogen-containing, in particular brominated and chlorinated compounds are: ethylene-1,2-bistetrabromoph- thalmide, epoxidized tetrabromobisphenol A resin, tetrabromobisphenol A oligocarbonate, tetrachlorobisphenol A oligocarbonate, pentabromopolyacrylate, brominated polystyrene and decabromodiphenyl ether. Examples of suitable organophosphorus compounds are the phosphorus compounds according to WO-A 98/17720 (=U.S. Pat. No. 6,538,024), e.g. triphenyl phosphate (TPP), resorcinol bis (diphenyl phosphate) (RDP) and the oligomers derived therefrom, and also bisphenol A bis(diphenyl phosphate) (BDP) and the oligomers derived therefrom, and organic and inorganic phosphonic acid derivatives and salts thereof, organic and inorganic phosphinic acid derivatives and salts thereof, in particular metal dialkylphosphinates, e.g. aluminium tris[dialkylphosphinates] or zinc bis[dialkylphosphinates] and moreover red phosphorus, phosphites, hypophosphites, phospine oxides, phosphazenes, melamine pyrophosphate and mixtures of these. Nitrogen compounds which can be used are those from the group of the allantoin derivatives, cyanuric acid derivatives, dicyandiamide derivatives, glycoluril derivatives, guanidine derivatives, ammonium derivatives and melamine derivatives, preferably allantoin, benzoguanamine, glycoluril, melamine, condensates of melamine, e.g. melem, melam or melom and, respectively, higher-condensation-level compounds of this type and adducts of melamine with acids, e.g. with cyanuric acid (melamine cyanurate), phosphoric acid (melamine phosphate) or with condensed phosphoric acids (e.g. melamine polyphosphate). Examples of suitable synergists are antimony compounds, in particular antimony trioxide, sodium antimonate and antimony pentoxide, zinc compounds, e.g. zinc borate, zinc oxide, zinc phosphate and zinc sulphide, tin compounds, e.g. tin stannate and tin borate, and also magnesium compounds, e.g. magnesium oxide, magnesium carbonate and magnesium borate. The materials known as carbonizers can also be added to the flame retardant, examples being phenol-formaldehyde resins, polycarbonates, polyphenyl ethers, polyimides, polysulphones, polyether sulphones, polyphenylene sulphides and polyether ketones, antidrip agents, such as tetrafluoroethylene polymers.

In another alternative preferred embodiment, the thermoplastic molding compositions can also comprise, in addition to components A) and B) and/or C) and/or D)
E) from 0.001 to 80 parts by weight, preferably from 2 to 40 parts by weight, particularly preferably from 4 to 19 parts by weight, of at least one elastomer modifier.

The elastomer modifiers to be used as component E) encompass one or more graft polymers of
E.1 from 5 to 95% by weight, preferably from 30 to 90% by weight, of at least one vinyl monomer
E.2 from 95 to 5% by weight, preferably from 70 to 10% by weight, of one or more graft bases with glass transition temperatures <10° C., preferably <0° C., particularly preferably <−20° C.

The median particle size ($d_{50}$ value) of the graft base E.2 is generally from 0.05 to 10 μm, preferably from 0.1 to 5 μm, particularly preferably from 0.2 to 1 μm.

Monomers E.1 are preferably mixtures composed of
E.1.1 from 50 to 99% by weight of vinylaromatics and/or ring-substituted vinylaromatics (such as styrene, α-methyl styrene, p-methyl styrene, p-chlorostyrene) and/or ($C_1$-$C_8$)-alkyl methacrylates (e.g. methyl methacrylate, ethyl methacrylate) and
E.1.2 from 1 to 50% by weight of vinyl cyanides (unsaturated nitrites, such as acrylonitrile and methacrylonitrile) and/or ($C_1$-$C_8$)-alkyl (meth)acrylate (e.g. methyl methacrylate, n-butyl acrylate, tert-butyl acrylate) and/or derivatives (such as anhydrides and imides) of unsaturated carboxylic acids (e.g. maleic anhydride and N-phenylmaleimide).

Preferred monomers E.1.1 have been selected from at least one of the monomers styrene, α-methylstyrene and methyl methacrylate, and preferred monomers E.1.2 have been selected from at least one of the monomers acrylonitrile, maleic anhydride and methyl methacrylate.

Particularly preferred monomers are E.1.1 styrene and E.1.2 acrylonitrile.

Examples of suitable graft bases E.2 for the graft polymers to be used in the elastomer modifiers E) are diene rubbers, EP(D)M rubbers, i.e. rubbers based on ethylene/propylene and, if appropriate, diene, acrylate rubbers, polyurethane rubbers, silicone rubbers, chloroprene rubbers and ethylene-vinyl acetate rubbers.

Preferred graft bases E.2 are diene rubbers (e.g. based on butadiene, isoprene, etc.) or mixtures of diene rubbers, or are copolymers of diene rubbers or of their mixtures with further copolymerizable monomers (e.g. according to E.1.1 and E.1.2), with the proviso that the glass transition temperature of component E.2 is <10° C., preferably <0° C., particularly preferably <−10° C.

Pure polybutadiene rubber is particularly preferred as graft base E.2.

Examples of particularly preferred polymers E are ABS polymers (emulsion, bulk and suspension ABS), as described by way of example in DE-A 2 035 390 (=U.S. Pat. No. 3,644,574) or in DE-A 2 248 242 (=GB-A 1 409 275) or in Ullmann, Enzyklopädie der Technischen Chemie [Encyclopaedia of Industrial Chemistry], Vol. 19 (1980), pp. 280 et seq. The gel content of the graft base E.2 is at least 30% by weight, preferably at least 40% by weight (measured in toluene).

The elastomer modifiers or graft copolymers E) are prepared via free-radical polymerization, e.g. via emulsion, suspensions, solution or bulk polymerization, preferably via emulsion or bulk polymerization.

Other particularly suitable graft rubbers are ABS polymers which are prepared via redox initiation using an initiator system composed of organic hydroperoxide and ascorbic acid according to U.S. Pat. No. 4,937,285.

Because it is known that the graft monomers are not necessarily entirely grafted onto the graft base during the grafting reaction, products which are obtained via (co)polymerization of the graft monomers in the presence of the graft base and are produced concomitantly during the work-up are also graft polymers E according to the invention.

Suitable acrylate rubbers are based on graft bases E.2 which are preferably polymers composed of alkyl acrylates, if appropriate with up to 40% by weight, based on E.2, of other polymerizable, ethylenically unsaturated monomers. Among the preferred polymerizable acrylic esters are C$_1$-C$_8$-alkyl esters, such as methyl, ethyl, butyl, n-octyl and 2-ethylhexyl esters; haloalkyl esters, preferably halo-C$_1$-C$_8$-alkyl esters, such as chloroethyl acrylate, and also mixtures of these monomers.

For crosslinking, monomers having more than one polymerizable double bond can be copolymerized. Preferred examples of crosslinking monomers are esters of unsaturated monocarboxylic acids having from 3 to 8 carbon atoms and of unsaturated monohydric alcohols having from 3 to 12 carbon atoms, or of saturated polyols having from 2 to 4 OH groups and from 2 to 20 carbon atoms, e.g. ethylene glycol dimethacrylate, allyl methacrylate; polyunsaturated heterocyclic compounds, e.g. trivinyl and triallyl cyanurate; polyfunctional vinyl compounds, such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds which have at least 3 ethylenically unsaturated groups.

Particularly preferred crosslinking monomers are the cyclic monomers triallyl cyanurate, triallyl isocyanurate, triacryloylhexahydro-s-triazine, triallylbenzenes. The amount of the crosslinking monomers is preferably from 0.02 to 5% by weight, in particular from 0.05 to 2% by weight, based on the graft base E.2.

In the case of cyclic crosslinking monomers having at least 3 ethylenically unsaturated groups, it is advantageous to restrict the amount to below 1% by weight of the graft base E.2.

Examples of preferred "other" polymerizable, ethylenically unsaturated monomers which can serve alongside the acrylic esters, if appropriate, for preparation of the graft base E.2 are acrylonitrile, styrene, α-methylstyrene, acrylamides, vinyl C$_1$-C$_6$-alkyl ethers, methyl methacrylate, butadiene. Acrylate rubbers preferred as graft base E.2 are emulsion polymers whose gel content is at least 60% by weight.

Further suitable graft bases according to E.2 are silicone rubbers having sites active for grafting purposes, as described in DE-A 3 704 657 (=U.S. Pat. No. 4,859,740), DE-A 3 704 655 (=U.S. Pat. No. 4,861,831), DE-A 3 631 540 (=U.S. Pat. No. 4,806,593) and DE-A 3 631 539 (=U.S. Pat. No. 4,812,515).

Alongside elastomer modifiers based on graft polymers, it is also possible to use, as component E), elastomer modifiers not based on graft polymers but having glass transition temperatures <10° C., preferably <0° C., particularly preferably <−20° C. Among these can be, by way of example, elastomers with block copolymer structure. Among these can also be, by way of example, elastomers which can undergo thermoplastic melting. Preferred materials mentioned here by way of example are EPM rubbers, EPDM rubbers and/or SEBS rubbers.

In another alternative preferred embodiment, the thermoplastic molding compositions can also comprise, in addition to components A) and B), and/or C) and/or D) and/or E)

F) from 0.001 to 80 parts by weight, preferably from 10 to 70 parts by weight, particularly preferably from 20 to 60 parts by weight, of a polycarbonate.

Preferred polycarbonates are those homopolycarbonates and copolycarbonates based on bisphenols of the general formula (II);

$$HO—Z—OH \quad (II)$$

in which Z is a divalent organic radical having from 6 to 30 carbon atoms and containing one or more aromatic groups.

Bisphenols of the formula (III) are preferred

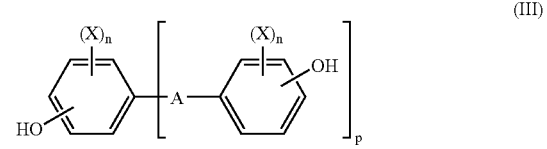

(III)

in which
A is a single bond, C1-C5-alkylene, C2-C5-alkylidene, C5-C6-cycloalkylidene, —O—, —SO—, —CO—, —S—, —SO2—, or is C6-C12-arylene, onto which further aromatic rings, if appropriate containing heteroatoms, may have been condensed,
or A is a radical of the formula (IV) or (V)

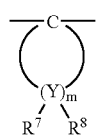 (IV)

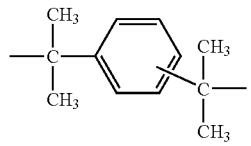 (V)

in which
X is in each case $C_1$-$C_{12}$-alkyl, preferably methyl or halogen, preferably chlorine and/or bromine,
n is in each case, independently of the others, 0, 1 or 2,
p is 1 or 0,
$R^7$ and $R^8$, individually selectable for each Y, and independently of each other, are hydrogen or $C_1$-$C_6$-alkyl, preferably hydrogen, methyl or ethyl,
Y is carbon and
m is a whole number from 4 to 7, preferably 4 or 5, with the proviso that on at least one atom Y, $R^7$ and $R^8$ are simultaneously alkyl.

Examples of bisphenols according to the general formula (II) are bisphenols belonging to the following groups: dihydroxybiphenyls, bis(hydroxyphenyl)alkanes, bis(hydroxyphenyl)cycloalkanes, indanebisphenols, bis(hydroxyphenyl) sulphides, bis(hydroxyphenyl) ethers, bis(hydroxyphenyl) ketones, bis(hydroxyphenyl) sulphones, bis(hydroxyphenyl) sulphoxides and α,α'-bis(hydroxyphenyl)diisopropylbenzenes.

Other examples of bisphenols according to the general formula (II) are derivatives of the bisphenols mentioned, e.g. obtainable via alkylation or halogenation on the aromatic rings of the bisphenols mentioned.

Examples of bisphenols according to the general formula (II) are in particular the following compounds: hydroquinone, resorcinol, 4,4'-dihydroxybiphenyl, bis(4-hydroxyphenyl) sulphide, bis(4-hydroxyphenyl) sulphone, bis(3,5-dimethyl-4-hydroxyphenyl)methane, bis(3,5-dimethyl-4-hydroxyphenyl) sulphone, 1,1-bis(3,5-dimethyl-4-hydroxyphenyl)-p/m-diisopropylbenzene, 1,1-bis(4-hydroxyphenyl)-1-phenylethane, 1,1-bis(3,5-dimethyl-4-hydroxyphenyl)cyclohexane, 1,1-bis(4-hydroxyphenyl)-3-methylcyclohexane; 1,1-bis(4-hydroxyphenyl)-3,3-dimethyl-cyclohexane, 1,1-bis(4-hydroxyphenyl)-4-methylcyclohexane, 1,1-bis(4-hydroxyphenyl)cyclohexane, 1,1-bis(4-hydroxyphenyl)-3,3,5-trimethylcyclohexane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, 2,2-bis-(4-hydroxyphenyl)propane (i.e. bisphenol A), 2,2-bis(3-chloro-4-hydroxyphenyl)propane, 2,2-bis(3,5-dibromo-4-hydroxyphenyl)propane, 2,4-bis(4-hydroxyphenyl)-2-methylbutane, 2,4-bis(3,5-dimethyl-4-hydroxyphenyl)-2-methylbutane, α,α'-bis(4-hydroxyphenyl)-o-diisopropylbenzene, α,α'-bis(4-hydroxyphenyl)-m-diisopropylbenzene (i.e. bisphenol M), α,α'-bis(4-hydroxyphenyl)-p-diisopropylbenzene and indanebisphenol.

Polycarbonates to be used with particular preference according to the invention as component F) are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

The bisphenols according to the general formula (II) and described can be prepared by known processes, e.g. from the corresponding phenols and ketones.

The bisphenols mentioned and processes for their production are described by way of example in the monograph H. Schnell, "Chemistry and Physics of Polycarbonates", Polymer Reviews, Volume 9, pp. 77-98, Interscience Publishers, New York, London, Sydney, 1964.

1,1-Bis(4-hydroxyphenyl)-3,3,5-trimethylcyclohexane and its preparation is described by way of example in U.S. Pat. No. 4,982,014.

Indanebisphenols can by way of example be prepared from isopropenylphenol or from its derivatives or from dimers of isopropenylphenol or of its derivatives in the presence of a Friedel-Craft catalyst in organic solvents.

Polycarbonates can be prepared by known processes. Examples of suitable processes for preparation of polycarbonates are preparation from bisphenols using phosgene by the interfacial process or from bisphenols using phosgene by the homogeneous-phase process known as the pyridine process, or from bisphenols using carbonic esters by the melt transesterification process. These preparation processes are described by way of example in H. Schnell, "Chemistry and Physics of Polycarbonates", Polymer Reviews, Volume 9, pp. 31-76, Interscience Publishers, New York, London, Sydney, 1964.

In the preparation of polycarbonate, it is preferable to use raw materials and auxiliaries with a very low level of contaminants. In particular in preparation by the melt transesterification process, the intention is that the bisphenols used and the carbonic acid derivatives used have minimal content of alkali metal ions and alkaline earth metal ions. These pure raw materials are obtainable by way of example by recrystallizing, washing or distilling the carbonic acid derivatives, e.g. carbonic esters, and the bisphenols.

The weight-average molar mass ($\underline{M}w$), which by way of example can be determined by an ultracentrifuge method or by scattered-light measurement, is preferably from 10 000 to 200 000 g/mol for the polycarbonates suitable according to the invention. Their weight-average molar mass is particularly preferably from 12 000 to 80 000 g/mol, with particular preference from 20 000 to 35 000 g/mol.

By way of example, it is possible to adjust the average molar mass of the inventive polycarbonates in a known manner via an appropriate amount of chain terminators. The chain terminators may be used individually or in the form of a mixture of various chain terminators.

Suitable chain terminators are either monophenols or else monocarboxylic acids. Examples of suitable monophenols are phenol, p-chlorophenol, p-tert-butylphenol, cumylphenol or 2,4,6-tribromophenol; and also long-chain alkylphenols, e.g. 4-(1,1,3,3-tetramethylbutyl)phenol or monoalkylphenols and, respectively, dialkylphenols having a total of from 8 to 20 carbon atoms in the alkyl substituents, e.g. 3,5-di-tert-butylphenol, p-tert-octylphenol, p-dodecylphenol, 2-(3,5-dimethylheptyl)phenol or 4-(3,5dimethylheptyl)phenol. Suitable monocarboxylic acids are benzoic acid, alkylbenzoic acids and halobenzoic acids.

Preferred chain terminators a phenol, p-tert-butylphenol, 4-(1,1,3,3-tetramethylbutyl)phenol and cumylphenol.

The amount of chain terminators is preferably from 0.25 to 10 mol %, based on the entirety of the bisphenols used in each case.

The polycarbonates used according to the invention may have branching in a known manner, and specifically preferably via incorporation of branching agents whose functionality is three or higher. Examples of suitable branching agents are those having three or more than three phenolic groups or those having three or more than three carboxylic acid groups.

Examples of suitable branching agents are phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tris(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, hexa(4-(4-hydroxyphenylisopropyl)phenyl)terephthalic ester, tetra(4-hydroxyphenyl)methane, tetra(4-(4-hydroxyphenylisopropyl)phenoxy)methane and 1,4-bis(4',4''-dihydroxytriphenylmethyl)benzene, and also 2,4-dihydroxybenzoic acid, trimesic acid, cyanuric chloride, 3,3-bis(3-methyl-4-hydroxyphenyl)-2-oxo-2,3-dihydroindole, trimesyl trichloride and $\alpha,\alpha',\alpha''$-tris(4-hydroxyphenyl)-1,3,5-triisopropylbenzene.

Preferred branching agents are 1,1,1-tris(4-hydroxyphenyl)ethane and 3,3-bis(3-methyl-4-hydroxyphenyl)-2-oxo-2,3-dihydroindole.

The amount of any branching agents to be used is preferably from 0.05 mol % to 2 mol %, based on the molar amount of bisphenol used.

By way of example, if the polycarbonate is prepared by the interfacial process, the branching agents can be used as an initial charge with the bisphenols and the chain terminators in the aqueous alkaline phase, or can be added dissolved in an organic solvent together with the carbonic acid derivatives. In the case of the transesterification process, the branching agents are preferably metered in together with the dihydroxyaromatics or bisphenols.

Preferred catalysts to be used during the preparation of polycarbonate by the melt transesterification process are the phosphonium salts and ammonium salts known from the literature.

Copolycarbonates can also be used. For the purposes of the invention, copolycarbonates are in particular polydiorganosiloxane-polycarbonate block copolymers whose weight-average molar mass ($\underline{M}$w) is preferably from 10 000 to 200 000 g/mol, particularly preferably from 20 000 to 80 000 g/mol (determined via gel chromatography after prior calibration via light-scattering measurement or ultracentrifuge method). The content of aromatic carbonate structural units in the polydiorganosiloxane-polycarbonate block copolymers is preferably from 75 to 97.5 parts by weight, particularly preferably from 85 to 97 parts by weight. The content of polydiorganosiloxane structural units in the polydiorganosiloxane-polycarbonate block copolymers is preferably from 25 to 2.5 parts by weight, particularly preferably from 15 to 3 parts by weight. The polydiorganosiloxane-polycarbonate block copolymers can by way of example be prepared starting from polydiorganosiloxanes which contain $\alpha,\omega$-bishydroxyaryloxy end groups, their average degree of polymerization being Pn=from 5 to 100, particularly preferably Pn=from 20 to 80.

The polydiorganosiloxane-polycarbonate block polymers can also be a mixture composed of polydiorganosiloxane-polycarbonate block copolymers with conventional polysiloxane-free, thermoplastic polycarbonates, the total content of polydiorganosiloxane structural units in this mixture preferably being from 2.5 to 25 parts by weight.

These polydiorganosiloxane-polycarbonate block copolymers are characterized in that their polymer chain contains on the one hand aromatic carbonate structural units (VI) and on the other hand contains polydiorganosiloxanes (VII) containing aryloxy end groups,

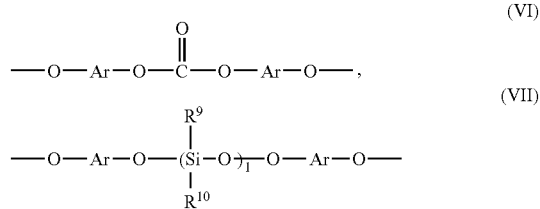

in which

Ar is identical or different difunctional aromatic radicals and $R^9$ and $R^{10}$ are identical or different and are linear alkyl, branched alkyl, alkenyl, halogenated linear alkyl, halogenated branched alkyl, aryl or halogenated aryl, preferably methyl, and 1 is the average degree of polymerization which is preferably from 5 to 100, particularly preferably from 20 to 80.

Alkyl in the above formula (VII) is preferably $C_1$-$C_{20}$-alkyl, and alkenyl in the above formula (VII) is preferably $C_2$-$C_6$-alkenyl; aryl in the above formulae (VI) or (VII) is preferably $C_6$-$C_{14}$-aryl. Halogenated in the above formulae means partially or completely chlorinated, brominated or fluorinated.

Examples of alkyl radicals, alkenyl radicals, aryl radicals, halogenated alkyl radicals and halogenated aryl radicals are methyl, ethyl, propyl, n-butyl, tert-butyl, vinyl, phenyl, naphthyl, chloromethyl, perfluorobutyl, perfluorooctyl and chlorophenyl.

These polydiorganosiloxane-polycarbonate block copolymers and their preparation are prior art and are described by way of example in U.S. Pat. No. 3,189,662.

By way of example, preferred polydiorganosiloxane-polycarbonate block copolymers can be prepared by reacting polydiorganosiloxanes containing $\alpha,\omega$-bishydroxyaryloxy end groups together with other bisphenols, if appropriate with concomitant use of branching agents in the conventional amounts, e.g. by the interfacial process (as described by way of example in H. Schnell, "Chemistry and Physics of Polycarbonates", Polymer Reviews, Volume 9, pp. 31-76, Interscience Publishers, New York, London, Sydney, 1964). The polydiorganosiloxanes containing $\alpha,\omega$-bishydroxyaryloxy end groups and used as starting materials for this synthesis, and their preparation, are prior art and are described by way of example in U.S. Pat. No. 3,419,634.

Conventional additives, e.g. mold-release agents, stabilizers and/or flow agents can be admixed in the melt with the polycarbonates or applied to their surface. By this stage, prior to compounding with the other components of the inventive molding compositions, the polycarbonates to be used preferably comprise mold-release agents.

In another alternative preferred embodiment, the thermoplastic molding compositions can also comprise, in addition to components A) and B), and/or C) and/or D) and/or E) and/or F)

G) from 0.001 to 10 parts by weight, preferably from 0.05 to 5 parts by weight, particularly preferably from 0.1 to 3.5 parts by weight, of other conventional additives.

Examples of conventional additives of component G) are stabilizers (e.g. UV stabilizers, heat stabilizers, gamma-ray stabilizers), antistatic agents, flow aids, mold-release agents, further fire-protection additives, emulsifiers, nucleating agents, plasticizers, lubricants, dyes, pigments and additives for increasing electrical conductivity. The additives mentioned and further suitable additives are described by way of example in Gäichter, Müller, Kunststoff-Additive [Plastics Additives], 3rd Edition, Hanser-Verlag, Munich, Vienna, 1989 and in Plastics Additives Handbook, 5th Edition, Hanser-Verlag, Munich, 2001. The additives may be used alone or in a mixture, or in the form of masterbatches.

Examples of stabilizers which can be used are organophosphorus compounds, phosphites, sterically hindered phenols, hydroquinones, aromatic secondary amines, e.g. diphenylamines, substituted resorcinols, salicylates, benzotriazoles and benzophenones, and also various substituted representatives of these groups and mixtures thereof.

Examples of pigments that can be used are titanium dioxide, zinc sulphide, ultramarine blue, iron oxide, carbon black, phthalocyanines, quinacridones, perylenes, nigrosin and anthraquinones.

Examples of nucleating agents which can be used are sodium phenylphosphinate or calcium phenylphosphinate, aluminium oxide, silicon dioxide, and also preferably talc.

Examples of lubricants and mold-release agents which can be used are ester waxes, pentaerytritol tetrastearate (PETS), long-chain fatty acids (e.g. stearic acid or behenic acid), salts thereof (e.g. Ca stearate or Zn stearate), and also amide derivatives (e.g. ethylenebisstearylamide) or montan waxes (mixtures composed of straight-chain, saturated carboxylic acids having chain lengths of from 28 to 32 carbon atoms). Examples of plasticizers which can be used are dioctyl phthalate, dibenzyl phthalate, butyl benzyl phthalate, hydrocarbon oils, N-(n-butyl)benzenesulphonamide.

The component G) used can also be polyolefins, preferably polyethylene and/or polypropylene. Low-molecular-weight polyethylene waxes and low-molecular-weight polypropylene waxes are particularly preferred.

Additives which can be added to increase electrical conductivity are carbon blacks, conductivity blacks, carbon fibrils, nanoscale graphite fibres and nanoscale carbon fibres, graphite, conductive polymers; metal fibres, and also other conventional additives for increasing electrical conductivity. Nanoscale fibres which can preferably be used are those known as "single-wall carbon nanotubes" or "multiwall carbon nanotubes" (e.g. from Hyperion Catalysis).

According to the invention, the following combinations of the components are preferred

AB; A,B,C; A,B,D; A,B,E; A,B,F; A,B,G; A,B,C,D; A,B,C, E; A,B,C,F; A,B,C,G;

A,B,D,E; A,B,D,F; A,B,D,G; A,B,E,F; A,B,E,G; A,B,F,G; A,B,C,D,E; A,B,C,D,F;

A,B,C,D,G; A,B,C,E,F; A,B,C,E,G; A,B,C,F,G; A,B,E,F,G; A,B,D,E,F;

A,B,D,E,G; A,B,D,F,G; A,B,C,D,E,F; A,B,C,D,E,G;

A,B,D,E,F,G; A,B,C,E,F,G; A,B,C,D,F,G; A,B,C,D,E,F,G.

However, the present invention also provides a process for preparation of the inventive thermoplastic molding compositions. This takes place by known processes via mixing of the components. The mixing of the components takes place via mixing of the appropriate proportions by weight of the components. The mixing of the components preferably takes place at temperatures of from 220 to 330° C. via combining, mixing, kneading, extruding or rolling of the components together. It can be advantageous to premix individual components. It can moreover be advantageous to produce moldings or semifinished products directly from a physical mixture (dry blend) prepared at room temperature (preferably from 0 to 40° C.) and composed of premixed components and/or of individual components.

The invention further provides the moldings to be produced from the inventive molding compositions comprising
A) from 99.9 to 10 parts by weight, preferably from 99.5 to 30 parts by weight, particularly preferably from 99.0 to 55 parts by weight, of at least one thermoplastic polyester, preferably of a polyalkylene terephthalate and
B) from 0.1 to 20 parts by weight, preferably from 0.25 to 15 parts by weight, particularly preferably from 1.0 to 10 parts by weight, of at least one copolymer composed of at least one α-olefin, preferably α-olefin and of at least one methacrylic ester or acrylic ester of an aliphatic alcohol, preferably of an aliphatic alcohol having from 1 to 30 carbon atoms, the MFI (measured at 190° C. for 2.16 kg) of the copolymer B) being not less than 50 g/10 min, preferably being in a range between 80 and 900 g/10 min.

A feature of the inventive moldings produced from the compositions which are used according to the invention and which are based on thermoplastic polyesters is higher impact resistance than moldings produced from molding compositions which have comparable viscosity and which have been prepared via use of a lower-viscosity base resin as component A). The tensile strain at break of the molding compositions to be used according to the invention here is also often higher in comparison with the identical-viscosity molding compositions based on a lower-viscosity base resin, while the tensile modulus is only very slightly reduced in the inventive moldings, and materials replacement is therefore possible.

The following further advantages are exhibited by the inventive molding compositions both in comparison with the molding compositions based on identical-viscosity base resin (component A) and also in comparison with the identical-viscosity molding compositions based on a low-viscosity base resin (component A):
lower density;
often more isotropic shrinkage behaviour, leading to less warpage of the moldings;
reduced level of shrinkage, leading to reduced warpage of the moldings;
improved hydrolysis resistance;
improved surface quality of the moldings.

The inventive molding compositions exhibit markedly improved flowability, in particular at the shear rates relevant for thermoplastics processing. This is also apparent, inter alia, from markedly reduced injection pressures.

The inventive molding compositions can be processed by conventional processes, for example via injection molding or extrusion, to give moldings or semifinished products. Examples of semifinished products are foils and sheets. Processing by injection molding is particularly preferred.

The moldings or semifinished products to be produced according to the invention from the thermoplastic molding compositions can be small or large parts and by way of example can be used in the motor vehicle, electrical, electronics, telecommunications, information technology, or computer industry, in the household, in sports, in medicine, or in the entertainment industry. In the motor vehicle industry, the moldings to be produced according to the invention can be incorporated into the cooling circulation system and/or into the oil circulation system of motor vehicles. In particular, the inventive molding compositions can be used for applications which require high melt flowability. An example of these applications is what is known as thin-wall technology, in which the wall thicknesses of moldings to be produced from the molding compositions are less than 2.5 mm, preferably less than 2.0 mm, particularly preferably less than 1.5 mm and most preferably less than 1.0 mm. Another example of these applications is cycle time reduction, for example via a reduction in processing temperature. Another application example is the processing of the molding compositions by way of what are known as multitooling systems, in which material is charged by way of a runner system to at least 4 molds, preferably at least 8 molds, particularly preferably at least 12 molds, most preferably at least 16 molds, in an injection molding procedure.

EXAMPLES

Component A1: Linear polybutylene terephthalate (Pocan® B 1300, commercially available product from Lanxess Deutschland GmbH, Leverkusen, Germany) with intrinsic viscosity of about 0.93 cm$^3$/g (measured in phenol: 1,2-dichlorobenzene=1:1 at 25° C.)

Component A2: Linear polybutylene terephthalate (Pocan® B 1100, commercially available product from Lanxess Deutschland GmbH, Leverkusen, Germany) with intrinsic viscosity of about 0.83 cm$^3$/g (measured in phenol: 1,2-dichlorobenzene=1:1 at 25° C.)

Component B: Copolymer composed of ethene and 2-ethylhexyl acrylate with an ethene content of 63% by weight and with an MFI of 550 (Lotryl® 37 EH 550 from Atofina Deutschland, Dusseldorf (since October 2004 Arkema GmbH)) [CAS No. 26984-27-0]

Component B1: Copolymer composed of ethene and acrylic acid-n-butylester with an ethene content of 70-74% by weight and with a MFI of 175 (Lotryl® 28BA175 from Atofina Deutschland, Dusseldorf (since October 2004 Arkema GmbH) [CAS No. 25750-84-9]

Comparative component V: Copolymer composed of ethene, methyl acrylate and glycidyl acrylate with 26% by weight methyl acrylate content and 8% glycidyl acrylate content, with an MFI of 6 (Lotader® AX 8900 from Atofina Deutschland, Dusseldorf (since October 2004 Arkema GmbH))

Component C: Glassfibre sized with silane-containing compounds and with a diameter of 10 μm (CS 7967, commercially available product from Lanxess N.V., Antwerp, Belgium)

Component D1: Antimony trioxide [CAS No. 1309-64-4] 80% strength masterbatch in polybutylene terephthalate Component D2: Tetrabromobisphenol A-diglycidyl ether-tetrabromobisphenol A copolymer [CAS No. 68928-70-1]

Component D3: PTFE [CAS No. 9002-84-0]

Component D4: 1,2-Bis(tetrabromophthalimido)ethane [CAS No. 32588-756-4]

Component E: Commercially available elastomer modifier based on an ABS polymer [CAS No. 9003-56-9]

Component F: Polycarbonate (Makrolon 2405, commercially available product from Bayer AG, Leverkusen, Germany)

Component G:

The following components familiar for use in thermoplastic polyesters were used as further additives:

Nucleating agent: Amounts of from 0.01 to 0.59% by weight of talc [CAS No. 14807-96-6].

Pigments: Titanium dioxide, zinc sulphide, carbon black, organic dyes, the amounts in each case being from 0 to 3.3% by weight.

UV stabilizer: Amounts of from 0 to 1% by weight of commercially available benzotriazole derivative.

Heat stabilizer: Amounts of from 0.01 to 0.59% by weight of conventional stabilizers based on phenyl phosphites.

Mold-release agent: Amounts of from 0.1 to 1% by weight preferably 0.1 to 0.68% by weight of commercially available fatty acid esters.

The nature and amount of each of the further additives (component G) used are the same for corresponding comparative examples and inventive examples, specifically using G=0.5%, G=0.7%, G=1.7%, G=3.4% and, respectively, G=1.85%.

Compositions based on PBT for the examples in Tables 1-4 were compounded in a ZSK32 (Werner and Pfleiderer) twin-screw extruder at melt temperatures of from 260 to 300° C. to give molding compositions, and the melt was discharged into a water bath and then pelletized.

The test specimens for the tests listed in Tables 1-4 were injection molded in an Arburg 320-210-500 injection molding machine at a melt temperature of about 260° C. and at a mold temperature of about 80° C.:

dumbbell specimens (thickness 3 mm to ISO 527)

80×10×4 mm$^3$ test specimens (to ISO 178)

standard test specimens for the UL 94 V test test specimens for the glow-wire test to DIN EN 60695-2-13

60×60×2 mm$^3$ plaques for shrinkage measurement to ISO 294-4

With the exception of the melt viscosity measurements and the measurements of melt indices, all of the tests listed in the tables below were carried out on the abovementioned test specimens.

Tensile modulus of elasticity: Stiffness to DIN/EN/ISO 527-2/1A.

Tensile strength to DIN/EN/ISO 527-2/1A.

Tensile strain at break: Extensibility determined to DIN/EN/ISO 527-2/1A.

Flexural modulus to DIN/EN ISO 178

Flexural strength to DIN/EN ISO 178

Outer fibre strain: Extensibility to DIN/EN/ISO 178

Impact strength: IZOD method to ISO 180 1U at room temperature and for comparison 10/Example 90 at −30° C.

Injection pressure: Recording of the pressure needed to injection mold the respective test specimens on the injection molding machine. It was determined on 80×10×4 mm$^3$ test specimens by process data recording of the pressure during injection phase and compressing phase.

UL 94 V combustibility: to UL 94

GWIT: Determination of glow-wire ignition temperature to DIN EN 60695-2-13

Shrinkage: To determine shrinkage properties, standardized sheets of dimension 60 mm×60 mm×2 mm (ISO 294-4) are injection molded. Longitudinal and transverse shrinkage is determined both in terms of molding shrinkage and in terms of after-shrinkage, via subsequent measurement.

Molding shrinkage and after-shrinkage together give the total shrinkage.

Density: Determination by the flotation method on test specimens to DIN EN ISO 1183-1.

Melt viscosity: Determined to DIN 54811/ISO 11443 at the stated shear rate and temperature, using Viscorobo 94.00 equipment from Göttfert after drying of the pellets at 120° C. for 4 hours in a vacuum dryer.

Melt index MVR (melt volume flow rate): Determined to DIN EN ISO 1133 with the stated force and temperature after drying of the pellets at 120° C. for 4 hours in a vacuum dryer.

Hydrolysis:

To measure hydrolysis resistance, test specimens produced from the inventive molding compositions were stored at 100° C. and 100% humidity in a steam sterilizer. After a number of days of hydrolysis (see Table 1), outer fibre strain at maximum flexural stress was measured to DIN EN ISO 178 and IZOD impact strength was measured to ISO 180/1U.

Surface: Test specimens of dimension 60 mm×60 mm×2 mm were used for surface appraisal and visual surface assessment. Decisive criteria for judgement were gloss, smoothness, colour and uniform surface structure.

TABLE 1

Reinforced molding compositions

|  |  | Comp. 1 | Comp. 2 | Comp. 3 | Comp. 4 | Ex. 1 | Ex. 2 | Ex. 3 |
|---|---|---|---|---|---|---|---|---|
| Component A1 | [%] | 69.5 | — | 64.5 | — | 64.5 | — | — |
| Component A2 | [%] | — | 69.5 | — | 64.5 | — | 64.5 | 63.5 |
| Component B | [%] | — | — | — | — | 5 | 5 | 6 |
| Comparison component V | [%] | — | — | 5 | 5 | — | — | — |
| Component C | [%] | 30 | 30 | 30 | 30 | 30 | 30 | 30 |
| Component G | [%] | 0.5 | 0.5 | 0.5 | 0.5 | 0.5 | 0.5 | 0.5 |
| Melt viscosity (260° C., 1000 s$^{-1}$) | [Pas] | 194 | 131 | 219 | 147 | 141 | 107 | 104 |
| Melt viscosity (260° C., 1500 s$^{-1}$) | [Pas] | 164 | 114 | 180 | 125 | 113 | 87 | 82 |
| Melt viscosity (270° C., 1000 s$^{-1}$) | [Pas] | 159 | 110 | 178 | 123 | 116 | 92 | — |
| Melt viscosity (270° C., 1500 s$^{-1}$) | [Pas] | 136 | 97 | 150 | 105 | 94 | 76 | — |
| Injection pressure for dumbbell specimen (ISO 527) | [bar] | 322 | 230 | 354 | 241 | 287 | 198 | — |
| Injection pressure for 80 × 10 × 4 specimen (ISO 178) | [bar] | 189 | 129 | 214 | 140 | 170 | 112 | — |
| Izod impact strength (ISO 180/1U, RT) | [kJ/m$^2$] | 50 | 47 | 60 | 56 | 55 | 53 | 56 |
| Izod impact strength (ISO 180/1U, RT) after 3 days of hydrolysis | [kJ/m$^2$] | 35 | — | — | — | — | — | 45 |
| Izod impact strength (ISO 180/1U, RT) after 7 days of hydrolysis | [kJ/m$^2$] | 23 | — | — | — | — | — | 31 |
| Izod impact strength (ISO 180/1U, RT) after 10 days of hydrolysis | [kJ/m$^2$] | 14 | — | — | — | — | — | 26 |
| Tensile modulus of elasticity | [MPa] | 9500 | 9800 | 8900 | 9000 | 9200 | 9000 | — |
| Tensile strength | [MPa] | 138 | 144 | 126 | 130 | 126 | 128 | — |
| Tensile strain at break | [%] | 2.6 | 2.5 | 2.9 | 3.2 | 2.9 | 2.5 | — |
| Density | [g/cm$^2$] | 1.55 | — | — | — | — | — | 1.46 |
| Total shrinkage (12/150° C.) | [%] |  |  |  |  |  |  |  |
| longitudinal |  | 0.33 | — | — | — | — | — | 0.30 |
| transverse |  | 1.52 | — | — | — | — | — | 1.27 |
| Outer fibre strain at maximum flexural stress | [%] | 3.5 | — | — | — | — | — | 3.3 |
| Outer fibre strain at maximum flexural stress after 10 days of hydrolysis | [%] | 1.6 | — | — | — | — | — | 1.9 |
| Surface quality |  | good | good | — | — | very good | very good | very good |

TABLE 2

Unreinforced molding compositions

|  |  | Comp. 5 | Comp. 6 | Ex. 4 | Ex. 5 |
|---|---|---|---|---|---|
| Component A1 | [%] | 99.5 | — | 95.5 | — |
| Component A2 | [%] | — | 99.5 | — | 95.5 |
| Component B | [%] | — | — | 4 | 4 |
| Component G | [%] | 0.5 | 0.5 | 0.5 | 0.5 |
| MVR at 260° C./2.16 kg | [cm$^3$/10 min] | 65 | 126 | 75 | 137 |
| Melt viscosity (260° C./1000 s$^{-1}$) | [Pas] | 105 | 62 | 73 | 50 |
| Melt viscosity (260° C., 1500 s$^{-1}$) | [Pas] | 96 | 59 | 62 | 44 |
| Izod impact strength (ISO 180/1U, RT) | [kJ/m$^2$] | 120 | 65 | 94 | 58 |
| Flexural modulus | [MPa] | 91 | 91 | 80 | 81 |
| Flexural strength | [MPa] | 2500 | 2550 | 2250 | 2300 |
| Outer fibre strain at maximum flexural stress | [%] | 6.1 | 6.2 | 6.0 | 6.1 |

TABLE 3

Flame-retardant molding compositions

|  |  | Comp. 7 | Ex. 6 | Comp. 8 | Ex. 7 | Comp. 9 | Ex. 8 |
|---|---|---|---|---|---|---|---|
| Component A1 | [%] | — | — | 35.1 | 32.6 | 71.8 | 67.3 |
| Component A2 | [%] | 51.8 | 47.3 | — | — | — | — |
| Component B | [%] | — | 4.5 | — | 4.5 | — | 4.5 |
| Component C | [%] | 29 | 29 | — | — | — | — |
| Component D1 | [%] | 5.5 | 5.5 | 4.5 | 4.5 | 3.75 | 3.75 |
| Component D2 | [%] | 11.5 | 11.5 | 13.5 | 13.5 | — | — |
| Component D3 | [%] | 0.5 | 0.5 | 0.5 | 0.5 | 0.1 | 0.1 |
| Component D4 | [%] | — | — | — | — | 10.5 | 10.5 |
| Component E | [%] | — | — | 18 | 18 | 12 | 12 |
| Component F | [%] | — | — | 25 | 23 | — | — |
| Component G | [%] | 1.7 | 1.7 | 3.4 | 3.4 | 1.85 | 1.85 |
| Melt viscosity (260° C., 1000$^{-1}$) | [Pas] | 135 | 114 | — | — | — | — |
| Melt viscosity (260° C., 1500$^{-1}$) | [Pas] | 115 | 93 | — | — | — | — |
| Melt viscosity (270° C., 1000$^{-1}$) | [Pas] | 112 | 101 | — | — | — | — |
| Melt viscosity (270° C., 1500$^{-1}$) | [Pas] | 97 | 82 | — | — | — | — |
| Injection pressure for dumbbell specimen (ISO 527) | [bar] | 232 | 208 | 314 | 264 | 229 | 218 |
| Injection pressure for 80 × 10 × 4 specimen (ISO 178) | [bar] | 134 | 122 | — | — | — | — |
| Izod impact strength (ISO 180/1U, RT) | [kJ/m$^2$] | 44 | 47 | 170 | 183 | — | — |
| Charpy impact strength (ISO179/1eU) | [kJ/m$^2$] | — | — | — | — | 83 | 134 |
| [Charpy space notched impact strength (ISO179/1eA)] | [kJ/m$^2$] | — | — | — | — | [7.4] | [9.0] |
| Tensile modulus of elasticity | [MPa] | 10900 | 10100 | 2200 | 2100 | 2500 | 2100 |
| Tensile stress at break [tensile stress at yield] | [MPa] [MPa] | 138 | 130 | [49] | [45] | [51] | [42] |
| Tensile strain at break [tensile strain at yield] | [%] | 2.0 | 2.0 | [3.2] | [3.3] | [3.1] | [3.1] |
| UL 94 V (0.75 mm) | class | V0 | V0 | — | — | V2 | V2 |
| UL 94 V (1.5 mm) | class | — | — | V0 | V0 | V0 | V0 |
| GWIT to IEC 60695-2-13 0.75/1.5 mm | [° C.] | — | — | >775 | >775 | — | — |
| GWIT to IEC 6005-2-13 3 mm | [° C.] | — | — | 750 | 775 | — | — |
| Longitudinal molding shrinkage* | [%] | 0.33 | 0.26 | — | — | 2.3 | 2.0 |
| Transverse molding shrinkage* | [%] | 0.91 | 0.78 | — | — | 2.3 | 1.9 |
| Longitudinal after-shrinkage (1 h/110° C.) | [%] | 0 | 0.04 | — | — | — | — |
| Transverse after-shrinkage (1 h/110° C.) | [%] | 0.02 | 0.03 | — | — | — | — |

*Hold pressure 600 bar

Further inventive examples are:

TABLE 4

Examples of inventive compounded PAT materials; data in % by weight; the compounded materials can also comprise amounts of at most 10% of additives such as processing aids (e.g. mold-release agents, stabilizers, nucleating agents, colorants, pigments etc.) (in each case present in the PAT component).

|  |  | Ex. 9 | Ex. 10 | Ex. 11 | Ex. 12 | Ex. 13 | Ex. 14 | Ex. 15 |
|---|---|---|---|---|---|---|---|---|
| Component A1 (inc. additives) | [%] | 95 | 60 | 85 | 32 | 44 | 50 | 35 |
| PET | [%] | — | 35 | — | — | — | 25 | 20 |
| Component F | [%] | — | — | — | 47 | 25 | — | — |
| Component C | [%] | — | — | 10 | 15 | 25 | 20 | 40 |
| Glass beads | [%] | — | — | — | — | — | — | — |
| Milled fibre | [%] | — | — | — | — | — | — | — |
| Talc | [%] | — | — | — | — | — | — | — |
| Titanium dioxide | [%] | — | — | — | — | — | — | — |
| Elastomer modifier (SAN) | [%] | — | — | — | — | — | — | — |
| Elastomer modifier (butyl graft core with MMA-based and, respectively, styrene/acrylonitrile-based shell) | [%] | — | — | — | — | — | — | — |
| Elastomer modifier (butadiene graft core with MMA-based and, respectively, styrene/acrylonitrile-based shell | [%] | — | — | — | — | — | — | — |

TABLE 4-continued

Examples of inventive compounded PAT materials; data in % by weight; the compounded materials can also comprise amounts of at most 10% of additives such as processing aids (e.g. mold-release agents, stabilizers, nucleating agents, colorants, pigments etc.) (in each case present in the PAT component).

| Component B | [%] | 5 | 5 | 5 | 6 | 6 | 5 | 5 |
|---|---|---|---|---|---|---|---|---|
| | | Ex. 16 | Ex. 17 | Ex. 18 | Ex. 19 | Ex. 20 | Ex. 21 | Ex. 22 | Ex. 23 |

| | | Ex. 16 | Ex. 17 | Ex. 18 | Ex. 19 | Ex. 20 | Ex. 21 | Ex. 22 | Ex. 23 |
|---|---|---|---|---|---|---|---|---|---|
| Component A1 (inc. additives) | [%] | 39 | 25 | 50 | 26 | 70 | 64 | 65 | 71 |
| PET | [%] | 27 | 25 | — | 30 | — | — | — | — |
| Component F | [%] | — | — | — | — | — | — | — | — |
| Component C | [%] | 15 | 25 | 25 | 25 | — | — | — | — |
| Glass beads | [%] | — | — | — | — | 25 | — | — | — |
| Milled fibre | [%] | — | — | — | — | — | 30 | — | — |
| Talc | [%] | — | — | — | — | — | — | 25 | — |
| Titanium dioxide | [%] | — | — | — | — | — | — | — | 25 |
| Elastomer modifier (SAN) | [%] | — | 10 | 10 | — | — | — | — | — |
| Elastomer modifier (butyl graft core with MMA-based and, respectively, styrene/acrylonitrile-based shell) | [%] | 15 | 10 | 10 | — | — | — | — | — |
| Elastomer modifier (butadiene graft core with MMA-based and, respectively, styrene/acrylonitrile-based shell | [%] | — | — | — | 15 | — | — | 5 | — |
| Component B | [%] | 4 | 5 | 5 | 4 | 5 | 6 | 5 | 4 |

TABLE 5

Examples of inventive compounded PAT materials; data in % by weight; the compounded materials can also comprise amounts of at most 10% of additives such as processing aids (e.g. mold-release agents, stabilizers, nucleating agents, colorants, pigments etc.) (in each case present in the PAT component).

| | | Ex. 24 | Ex. 25 | Ex. 26 | Ex. 27 | Ex. 28 | Ex. 29 |
|---|---|---|---|---|---|---|---|
| Component A1 (inc. additives) | [%] | — | 5 | 15 | 85 | 70 | 55 |
| PET | [%] | 65 | 32 | 44 | — | — | — |
| Component F | [%] | — | 47 | 25 | — | — | — |
| Component C | [%] | 30 | — | — | — | — | 25 |
| Glass beads | [%] | — | — | — | — | — | — |
| Milled fibre | [%] | — | — | — | 15 | — | — |
| Talc | [%] | — | 10 | 10 | — | 15 | — |
| Titanium dioxide | [%] | — | — | — | — | — | — |
| Elastomer modifier (butyl graft core with MMA-based and, respectively, styrene/acrylonitrile-based shell) | [%] | — | — | — | — | — | — |
| Elastomer modifier (butadiene graft core with MMA-based and, respectively, styrene/acrylonitrile-based shell) | [%] | — | — | — | 10 | 25 | 15 |
| Component B | [%] | 5 | 6 | 6 | 5 | 5 | 5 |

| | | Ex. 30 | Ex. 31 | Ex. 32 | Ex. 33 | Ex. 34 | Ex. 35 | Ex. 36 |
|---|---|---|---|---|---|---|---|---|
| Component A1 (inc. additives) | [%] | 55 | 60 | 75 | 15 | 10 | 35 | 65 |
| PET | [%] | — | — | — | 40 | 40 | 20 | — |
| Component F | [%] | — | — | — | — | — | — | — |
| Component C | [%] | 25 | 30 | 15 | 30 | 30 | 20 | — |
| Glass beads | [%] | — | — | — | — | — | — | — |
| Milled fibre | [%] | — | — | — | — | — | — | — |
| Talc | [%] | — | — | — | 10 | 10 | 20 | 25 |
| Titanium dioxide | [%] | — | — | — | — | — | — | — |
| Elastomer modifier (butyl graft core with MMA-based and, respectively, styrene/acrylonitrile-based shell) | [%] | 15 | 5 | — | — | — | — | — |

TABLE 5-continued

Examples of inventive compounded PAT materials; data in % by weight; the compounded materials can also comprise amounts of at most 10% of additives such as processing aids (e.g. mold-release agents, stabilizers, nucleating agents, colorants, pigments etc.) (in each case present in the PAT component).

| | | | | | | | | |
|---|---|---|---|---|---|---|---|---|
| Elastomer modifier (butadiene graft core with MMA-based and, respectively, styrene/acrylonitrile-based shell) | [%] | — | | 5 | — | 5 | 15 | 5 |
| Component B | [%] | 5 | 5 | 5 | 5 | 5 | 5 | 5 |

TABLE 6

Examples of inventive compounded PAT materials; data in % by weight; the compounded materials can also comprise amounts of at most 10% of additives such as processing aids (e.g. mold-release agents, stabilizers, nucleating agents, colorants, pigments etc.) (in each case present in the PAT component).

| | | Ex. 37 | Ex. 38 | Ex. 39 | Ex. 40 | Ex. 41 | Ex. 42 | Ex. 43 | Ex. 44 |
|---|---|---|---|---|---|---|---|---|---|
| Component A1 (inc. additives) | [%] | 46.7 | 49.7 | 47.7 | 45 | 40 | 40 | 40 | 70 |
| PET | [%] | — | — | — | — | — | — | — | — |
| Component F | [%] | — | — | — | — | — | — | — | — |
| Component C | [%] | 30 | 30 | 30 | 25 | 25 | 25 | 25 | — |
| Component D1 | [%] | 5 | 5 | 5 | — | — | — | — | — |
| Component D3 | [%] | 0.3 | 0.3 | 0.3 | — | — | — | — | — |
| Polybromostyrene | [%] | — | — | 12 | — | — | — | — | — |
| Tetrabromobisphenol A oligocarbonate | [%] | 13 | — | — | — | — | — | — | — |
| Pentabromobenzyl polyacrylate | [%] | — | 10 | — | — | — | — | — | — |
| Decabromodiphenyl-ethane | [%] | — | — | — | — | — | — | — | — |
| Zinc bis[diethylphosphinate] | [%] | — | — | — | 25 | 15 | — | — | 25 |
| Melamine polyphosphate | [%] | — | — | — | — | — | 15 | 15 | — |
| Melamine cyanurate | [%] | — | — | — | — | 15 | — | — | — |
| Bisphenol A diphosphate | [%] | — | — | — | — | — | 15 | 15 | — |
| Component B | [%] | 5 | 5 | 5 | 5 | 5 | 5 | 5 | 5 |

| | | Ex. 45 | Ex. 46 | Ex. 47 | Ex. 48 | Ex. 49 | Ex. 50 | Ex. 51 |
|---|---|---|---|---|---|---|---|---|
| Component A1 (inc. additives) | [%] | 49.7 | 75.7 | 78.7 | 76.7 | 79.7 | — | — |
| PET | [%] | — | — | — | — | — | 45.7 | 75.7 |
| Component F | [%] | — | — | — | — | — | — | — |
| Component C | [%] | 30 | — | — | — | — | 30 | — |
| Component D1 | [%] | 5 | 5 | 5 | 5 | 5 | 5 | 5 |
| Component D3 | [%] | 0.3 | 0.3 | 0.3 | 0.3 | 0.3 | 0.3 | 0.3 |
| Polybromostyrene | [%] | — | — | — | 13 | — | — | — |
| Tetrabromobisphenol A oligocarbonate | [%] | — | 14 | — | — | — | 14 | 14 |
| Pentabromobenzyl polyacrylate | [%] | — | — | 11 | — | — | — | — |
| Decabromodiphenyl-ethane | [%] | 10 | — | — | — | 10 | — | — |
| Zinc bis[diethylphosphinate] | [%] | — | — | — | — | — | — | — |
| Melamine polyphosphate | [%] | — | — | — | — | — | — | — |
| Melamine cyanurate | [%] | — | — | — | — | — | — | — |
| Bisphenol A diphosphate | [%] | — | — | — | — | — | — | — |
| Component B | [%] | 5 | 5 | 5 | 5 | 5 | 5 | 5 |

TABLE 7

Examples of inventive compounded PAT materials; data in % by weight; the compounded materials can also comprise amounts of at most 10% of additives such as processing aids (e.g. mold-release agents, stabilizers, nucleating agents, colorants, pigments etc.) (in each case present in the PAT component).

| | | Ex. 52 | Ex. 53 | Ex. 54 | Ex. 55 | Ex. 56 | Ex. 57 | Ex. 58 | Ex. 59 |
|---|---|---|---|---|---|---|---|---|---|
| Component A1 (inc. additives) | [%] | 45.7 | 45.7 | 45.7 | 45.7 | 45.7 | 45.7 | 35.7 | 45.7 |
| PET | [%] | — | — | — | — | — | — | — | — |

TABLE 7-continued

Examples of inventive compounded PAT materials; data in % by weight; the compounded materials can also comprise amounts of at most 10% of additives such as processing aids (e.g. mold-release agents, stabilizers, nucleating agents, colorants, pigments etc.) (in each case present in the PAT component).

| | | | | | | | | | |
|---|---|---|---|---|---|---|---|---|---|
| Component F | [%] | — | — | — | — | — | — | — | 30 |
| Component C | [%] | — | — | — | — | — | — | 30 | — |
| Glass beads | [%] | 30 | — | — | — | — | — | — | — |
| Milled fibre | [%] | — | 30 | — | — | — | — | — | — |
| Talc | [%] | — | — | 30 | — | — | — | — | — |
| Wollastonite | [%] | — | — | — | 30 | — | — | — | — |
| Kaolin | [%] | — | — | — | — | 30 | — | — | — |
| Mica | [%] | — | — | — | — | — | 30 | — | — |
| Elastomer modifier | [%] | — | — | — | — | — | — | 10 | — |
| Component D1 | [%] | 5 | 5 | 5 | 5 | 5 | 5 | 5 | 5 |
| Component D3 | [%] | 0.3 | 0.3 | 0.3 | 0.3 | 0.3 | 0.3 | 0.3 | 0.3 |
| Tetrabromobisphenol A oligocarbonate | [%] | 14 | 14 | 14 | 14 | 14 | 14 | 14 | 14 |
| Melamine cyanurate | [%] | — | — | — | — | — | — | — | — |
| Bisphenol A diphosphate | [%] | — | — | — | — | — | — | — | — |
| Component B | [%] | 5 | 5 | 5 | 5 | 5 | 5 | 5 | 5 |

| | | Ex. 60 | Ex. 61 | Ex. 62 | Ex. 63 | Ex. 64 | Ex. 65 | Ex. 66 |
|---|---|---|---|---|---|---|---|---|
| Component A1 (inc. additives) | [%] | 35 | 40.7 | 30 | 25.7 | 45.7 | 60.7 | 45.7 |
| PET | [%] | — | — | — | 20 | 30 | — | — |
| Component F | [%] | 30 | 15 | 15 | — | — | — | — |
| Component C | [%] | — | 20 | 20 | 30 | — | 15 | 15 |
| Glass beads | [%] | — | — | — | — | — | — | 15 |
| Milled fibre | [%] | — | — | — | — | — | — | — |
| Talc | [%] | — | — | — | — | — | — | — |
| Wollastonite | [%] | — | — | — | — | — | — | — |
| Kaolin | [%] | — | — | — | — | — | — | — |
| Mica | [%] | — | — | — | — | — | — | — |
| Elastomer modifier | [%] | — | — | — | — | — | — | — |
| Component D1 | [%] | — | 5 | — | 5 | 5 | 5 | 5 |
| Component D3 | [%] | — | 0.3 | — | 0.3 | 0.3 | 0.3 | 0.3 |
| Tetrabromobisphenol A oligocarbonate | [%] | — | 14 | — | 14 | 14 | 14 | 14 |
| Melamine cyanurate | [%] | 15 | — | 15 | — | — | — | — |
| Bisphenol A diphosphate | [%] | 15 | — | 15 | — | — | — | — |
| Component B | [%] | 5 | 5 | 5 | 5 | 5 | 5 | 5 |

TABLE 8

Examples of inventive compounded PAT materials; data in % by weight; the compounded materials can also comprise amounts of at most 10% of additives such as processing aids (e.g. mold-release agents, stabilizers, nucleating agents, colorants, pigments etc.) (in each case present in the PAT component).

| | | Ex. 67 | Ex. 68 | Ex. 69 | Ex. 70 | Ex. 71 | Ex. 72 | Ex. 73 |
|---|---|---|---|---|---|---|---|---|
| Component A1 (inc. additives) | [%] | 45.7 | 45.7 | 45.7 | 45.7 | 45.7 | 51.8 | 51.8 |
| PET | [%] | — | — | — | — | — | — | — |
| Component F | [%] | — | — | — | — | — | — | — |
| Component C | [%] | 15 | 15 | 15 | 15 | 15 | 30 | 30 |
| Milled fibre | [%] | 15 | — | — | — | — | — | — |
| Talc | [%] | — | 15 | — | — | — | — | — |
| Wollastonite | [%] | — | — | 15 | — | — | — | — |
| Kaolin | [%] | — | — | — | 15 | — | — | — |
| Mica | [%] | — | — | — | — | 15 | — | — |
| Component D1 | [%] | 5 | 5 | 5 | 5 | 5 | — | — |
| Component D3 | [%] | 0.3 | 0.3 | 0.3 | 0.3 | 0.3 | 0.2 | 0.2 |
| Tetrabromobisphenol A oligocarbonate | [%] | 14 | 14 | 14 | 14 | 14 | — | — |
| Melamine polyphosphate | [%] | — | — | — | — | — | — | 6 |
| Melamine cyanurate | [%] | — | — | — | — | — | 6 | — |
| Aluminium tris[diethylphosphinate] | [%] | — | — | — | — | — | — | — |
| Red phosphorus | [%] | — | — | — | — | — | 7 | 7 |
| Component B | [%] | 5 | 5 | 5 | 5 | 5 | 5 | 5 |

| | Ex. 74 | Ex. 75 | Ex. 76 | Ex. 77 | Ex. 78 | Ex. 79 |
|---|---|---|---|---|---|---|

TABLE 8-continued

Examples of inventive compounded PAT materials; data in % by weight; the compounded materials can also comprise amounts of at most 10% of additives such as processing aids (e.g. mold-release agents, stabilizers, nucleating agents, colorants, pigments etc.) (in each case present in the PAT component).

| | | | | | | | |
|---|---|---|---|---|---|---|---|
| Component A1 (inc. additives) | [%] | 40.8 | 71 | 71 | 51 | — | — |
| PET | [%] | — | — | — | 20 | 71 | 71 |
| Component F | [%] | 11 | — | — | — | — | — |
| Component C | [%] | 30 | — | — | — | — | — |
| Milled fibre | [%] | — | — | — | — | — | — |
| Talc | [%] | — | — | — | — | — | — |
| Wollastonite | [%] | — | — | — | — | — | — |
| Kaolin | [%] | — | — | — | — | — | — |
| Mica | [%] | — | — | — | — | — | — |
| Component D1 | [%] | — | — | — | — | — | — |
| Component D3 | [%] | 0.2 | — | — | — | — | — |
| Tetrabromobisphenol A oligocarbonate | [%] | — | — | — | — | — | — |
| Melamine polyphosphate | [%] | — | 12 | — | — | 12 | — |
| Melamine cyanurate | [%] | 6 | — | 12 | 12 | — | 12 |
| Aluminium tris[diethylphosphinate] | [%] | — | 12 | 12 | 12 | 12 | 12 |
| Red phosphorus | [%] | 7 | — | — | — | — | — |
| Component B | [%] | 5 | 5 | 5 | 5 | 5 | 5 |

TABLE 9

Examples of inventive compounded PAT materials; data in % by weight; the compounded materials can also comprise amounts of at most 10% of additives such as processing aids (e.g. mold-release agents, stabilizers, nucleating agents, colorants, pigments etc.) (in each case present in the PAT component).

| | | Ex. 80 | Ex. 81 | Ex. 82 | Ex. 83 | Ex. 84 | Ex. 85 | Ex. 86 | Ex. 87 | Ex. 88 | Ex. 89 |
|---|---|---|---|---|---|---|---|---|---|---|---|
| Component A1 (inc. additives) | [%] | 46 | 46 | 26 | — | — | 46 | 46 | 26 | — | — |
| PET | [%] | — | — | 20 | 46 | 46 | — | — | 20 | 46 | 46 |
| Component C | [%] | 25 | 25 | 25 | 25 | 25 | — | — | — | — | — |
| Milled fibre | [%] | — | — | — | — | — | — | — | — | — | — |
| Talc | [%] | — | — | — | — | — | 25 | 25 | 25 | 25 | 25 |
| Wollastonite | [%] | — | — | — | — | — | — | — | — | — | — |
| Kaolin | [%] | — | — | — | — | — | — | — | — | — | — |
| Mica | [%] | — | — | — | — | — | — | — | — | — | — |
| Component D1 | [%] | — | — | — | — | — | — | — | — | — | — |
| Component D3 | [%] | — | — | — | — | — | — | — | — | — | — |
| Tetrabromobisphenol A oligocarbonate | [%] | — | — | — | — | — | — | — | — | — | — |
| Melamine polyphosphate | [%] | 12 | — | — | 12 | — | 12 | — | — | 12 | — |
| Melamine cyanurate | [%] | — | 12 | 12 | — | 12 | — | 12 | 12 | — | 12 |
| Aluminium tris[diethylphosphinate] | [%] | 12 | 12 | 12 | 12 | 12 | 12 | 12 | 12 | 12 | 12 |
| Red phosphorus | [%] | — | — | — | — | — | — | — | — | — | — |
| Component B | [%] | 5 | 5 | 5 | 5 | 5 | 5 | 5 | 5 | 5 | 5 |

TABLE 10

| | | Comp. 10 | Example 90 |
|---|---|---|---|
| Component A1 | [%] | 69.3 | 64.3 |
| Component B1 | [%] | — | 5.0 |
| Component C | [%] | 30.0 | 30.0 |
| Component G | [%] | 0.7 | 0.7 |
| Injection pressure | [bar] | 207 | 179 |
| Melt viscosity (260° C., 1000 s$^{-1}$) | [Pas] | 208 | 153 |
| Melt viscosity (260° C., 1500 s$^{-1}$) | [Pas] | 176 | 125 |
| Melt viscosity (280° C., 1000 s$^{-1}$) | [Pas] | 127 | 107 |
| Melt viscosity (280° C., 1500 s$^{-1}$) | [Pas] | 109 | 89 |
| Izod impact strength (ISO 180/1U, RT) | [kJ/m$^2$] | 55 | 58 |
| Izod impact strength (ISO 180/1U, RT) after 5 days hydrolysis | [kJ/m$^2$] | 25 | 37 |
| Izod impact strength (ISO 180/1U, RT) after 10 days hydrolysis | [kJ/m$^2$] | 15 | 28 |
| Izod impact strength (ISO 180/1U, −30° C.) | [kJ/m$^2$] | 56 | 70 |

TABLE 10-continued

|  |  | Comp. 10 | Example 90 |
|---|---|---|---|
| Total shrinkage (1 h/150° C.) | [%] | | |
| longitudinal | | 0.48 | 0.45 |
| transverse | | 1.30 | 1.09 |
| Bending test: | | | |
| Flexural strength | [MPa][MPa] | 217 | 196 |
| Outer fiber strength | [%] | 3.4 | 3.4 |
| Flexural modulus | [MPa] | 9016 | 8316 |
| Bending test after 5 days hydrolysis | | | |
| Flexural strength | [MPa] | 158 | 169 |
| Outer fiber strength | [%] | 2.2 | 2.6 |
| Flexural modulus | [MPa] | 8676 | 8055 |
| Bending test after 10 days hydrolysis | | | |
| Flexural strength | [MPa] | 121 | 138 |
| Outer fiber strength | [%] | 1.7 | 2.0 |
| Flexural modulus | [MPa] | 8374 | 8005 |
| Density | [g/cm$^3$] | 1.53 | 1.49 |
| Surface quality | | gut | sehr gut |

RT = room temperature

What is claimed is:

1. A thermoplastic molding composition comprising
A) from 99.9 to 10 parts by weight of at least one thermoplastic polyester and
B) from 0.1 to 20 parts by weight of at least one copolymer comprising at least one olefin and at least one methacrylic ester or acrylic ester of an aliphatic alcohol, the Melt Flow Index (MAI) of the copolymer B) being not less than 50 g/10 min.

2. The thermoplastic molding composition according to claim 1, wherein less than 4% by weight of the copolymer B) is composed of monomer units containing further reactive functional groups selected from the group consisting of epoxides, oxetanes, anhydrides, imides, aziridines, furans, acids, amines, and oxazolines.

3. The thermoplastic molding composition according to claim 1, wherein the methacrylic ester or acrylic ester of an aliphatic alcohol in the copolymer B) is 2-ethylhexyl acrylate.

4. The thermoplastic molding composition according to claim 3, wherein the olefin in the copolymer B) is ethene.

5. The thermoplastic molding composition according to claim 1, wherein the MFI of The copolymer B) is in The range between 80 and 900 g/10 min.

6. The thermoplastic molding composition according to claim 1, further comprising one or more components chosen from the series of:
C) from 0.001 to 70 parts by weight of at least one filler or reinforcing material,
D) from 0.001 to 50 parts by weight of at least one flame retardant additive,
E) from 0.001 to 80 parts by weight of at least one elastomer modifier,
F) from 0.001 to 80 parts by weight of a polycarbonate, and
G) from 0.001 to 10 parts by weight of other conventional additives.

7. A process for preparing the thermoplastic molding composition according to claim 1, comprising mixing the appropriate proportions by weight of components A) and B) of claim 1.

8. A molding or a semifinished product obtained by injection molding or extrusion of the thermoplastic molding composition according to claim 1.

9. A thermoplastic molding composition according to claim 1, wherein the methacrylic ester or acrylic ester of en aliphatic alcohol in the copolymer B) is n-butyl acrylate.

10. A process for forming a molding or a semifinished product comprising:
providing the thermoplastic molding composition of claim 1 to an injection molding apparatus, and
injection molding said thermoplastic molding composition into said molding or semifinished product.

11. A process for forming a molding or a semifinished product comprising:
providing the thermoplastic molding composition of claim 1 to an extrusion apparatus, and
extruding said thermoplastic molding composition into said molding or semifinished product.

12. A molded article comprising:
a wall having a wall-thickness of less than 2.5 mm and wherein said molding article is formed of the thermoplastic molding composition of claim 1.

13. A process for forming multiple moldings comprising:
providing the thermoplastic molding composition of claim 1 to a multi-tooling molding apparatus, wherein said multi-tooling molding apparatus includes a runner system capable of charging at least four molds; and
charging said four molds with said thermoplastic molding composition via said runner system.

* * * * *